(12) United States Patent
Guiffault

(10) Patent No.: US 9,519,108 B1
(45) Date of Patent: Dec. 13, 2016

(54) EXPANDED BEAM FIBER OPTIC SYSTEM

(71) Applicant: Optical Cable Corporation, Roanoke, VA (US)

(72) Inventor: Nicolas P. Guiffault, Allen, TX (US)

(73) Assignee: Optical Cable Corporation, Roanoke, VA (US)

( * ) Notice: Subject to any disclaimer, the term of this patent is extended or adjusted under 35 U.S.C. 154(b) by 44 days.

(21) Appl. No.: 14/316,092

(22) Filed: Jun. 26, 2014

Related U.S. Application Data

(60) Provisional application No. 61/840,947, filed on Jun. 28, 2013.

(51) Int. Cl.
*G02B 6/36* (2006.01)
*G02B 6/32* (2006.01)
*G02B 6/38* (2006.01)

(52) U.S. Cl.
CPC ............... *G02B 6/32* (2013.01); *G02B 6/3825* (2013.01); *G02B 6/3846* (2013.01); *G02B 6/3877* (2013.01)

(58) Field of Classification Search
None
See application file for complete search history.

(56) References Cited

U.S. PATENT DOCUMENTS

| 5,216,734 | A * | 6/1993 | Grinderslev | 385/60 |
| 6,012,852 | A |  1/2000 | Kadar-Kallen et al. | |
| 6,736,547 | B2 | 5/2004 | Stevens et al. | |
| 7,031,567 | B2 | 4/2006 | Grinderslev et al. | |
| 7,104,701 | B1 | 9/2006 | Durrant et al. | |
| 7,460,750 | B2 | 12/2008 | Durrant et al. | |

(Continued)

FOREIGN PATENT DOCUMENTS

| EP | 2270561 A1 | 1/2011 |
| ES | 2391935 T3 | 12/2012 |

(Continued)

OTHER PUBLICATIONS

R. Gale Wilson, "Numerical Aperture Limits on Efficient Ball Lens Coupling of Laser Diodes to Single-Mode Fibers With Defocus to Balance Spherical Aberration," NASA Technical Memorandum 4578, Nov. 1994, NASA Langley Research Center, Hampton, VA 23681-0001.

(Continued)

*Primary Examiner* — Tina Wong
(74) *Attorney, Agent, or Firm* — The Van Winkle Law Firm; David M. Carter; William G. Heedy

(57) ABSTRACT

Expanded beam fiber optic connectors for establishing an aligned connection between an end of an optical fiber and a ball lens. A housing includes a bore and is made of a compressible material for secure press fit of components within the bore, including the ball lens. A ferrule at the end of the optical fiber supports the optical fiber. In one embodiment, a section of optical fiber is coaxially centered within and supported by a single piece fiber stub with stepped outside diameters defining a press fit end and a secondary connection end, with a butt joint between the other end of the section of optical fiber and the end of the optical fiber being connected. In another embodiment, the ferrule is inserted within a longitudinally extending sleeve having an outside diameter sized for being press fit within the bore and an inside diameter sized for receiving the ferrule.

8 Claims, 2 Drawing Sheets

(56) References Cited

U.S. PATENT DOCUMENTS

| | | | |
|---|---|---|---|
| 7,495,837 B2 | 2/2009 | Smith et al. | |
| 7,758,255 B2 | 7/2010 | Jones | |
| 7,775,725 B2 * | 8/2010 | Grinderslev | 385/74 |
| 8,085,472 B2 | 12/2011 | Kadar-Kallen | |
| 8,556,521 B2 | 10/2013 | Everett et al. | |
| 8,616,781 B2 | 12/2013 | Knapp | |
| 8,768,120 B2 | 7/2014 | Pezeshki et al. | |
| 8,911,157 B2 * | 12/2014 | Kadar-Kallen et al. | 385/79 |
| 9,039,291 B2 * | 5/2015 | Doit et al. | 385/74 |
| 2002/0131721 A1 * | 9/2002 | Gaio | G02B 6/421 385/60 |
| 2007/0160327 A1 * | 7/2007 | Lewallen | G02B 6/3817 385/53 |
| 2008/0050073 A1 * | 2/2008 | Kadar-Kallen et al. | 385/79 |
| 2008/0175542 A1 * | 7/2008 | Lu | G02B 6/3816 385/62 |
| 2008/0279509 A1 | 11/2008 | Durrant et al. | |
| 2009/0324175 A1 * | 12/2009 | Everett et al. | 385/72 |
| 2010/0027943 A1 | 2/2010 | Armani et al. | |
| 2010/0329612 A1 | 12/2010 | Everett et al. | |
| 2012/0014645 A1 | 1/2012 | Kadar-Kallen | |
| 2012/0155807 A1 | 6/2012 | Knapp | |
| 2013/0163252 A1 | 6/2013 | Pezeshki et al. | |
| 2014/0096359 A1 | 4/2014 | Everett et al. | |
| 2014/0369648 A1 * | 12/2014 | Nielson | 385/72 |

FOREIGN PATENT DOCUMENTS

| | | |
|---|---|---|
| GB | 2408350 B | 3/2006 |
| WO | 2007119036 A1 | 10/2007 |

OTHER PUBLICATIONS

Edward Simonini and James Douthit, "Expanded Beam & Physical Contact Fiber Optic Connectors," date unknown, Amphenol FiberSystems International, Allen, TX 75013, downloaded from the internet website http://www.fibersystems.com/technical-resources/fiber-optic-whitepapers.

* cited by examiner

EXPANDED BEAM FIBER OPTIC SYSTEM

CROSS-REFERENCE TO RELATED APPLICATION

The benefit of U.S. provisional patent application Ser. No. 61/840,947, filed Jun. 28, 2013, is claimed.

BACKGROUND OF THE INVENTION

The invention relates generally to the field of fiber optic assemblies holding a lens to couple a light source to an optical fiber, and, more particularly, to expanded beam fiber optic connectors.

Connectors are used at numerous points in fiber optic communication systems. Expanded beam fiber optic connectors typically use two lenses to expand, collimate, and then refocus the light from a transmitting optical fiber into a receiving optical fiber. Expanded beam optic interfaces result in reduced signal loss which can occur due to contamination. Lack of physical contact potentially eliminates mechanical wear found in physical contact connectors, allowing more connector mating cycles.

It is desirable to maximize the power of light signals entering and exiting the lenses. In addition to engineering the physical properties of the lenses and the optical fibers for maximum transmission ability, these components need to be housed in appropriate circuit inserts. Modern manufacturing methods have made housings more readily available. Even so, there is continued development of specific ways of securing a lens with particular collimating characteristics so that the lens transmits an optical signal to an associated fiber with maximum power.

SUMMARY OF THE INVENTION

In one aspect, an expanded beam fiber optic connector for establishing an aligned connection of an end of an optical fiber with a ball lens is provided. The connector includes a ferrule at the end of the optical fiber supporting the optical fiber, the optical fiber being coaxially centered within the ferrule. The ferrule has a ferrule outside diameter. The connector also includes a housing including a bore having a bore inside diameter larger than the ferrule outside diameter. The housing is made of a compressible material for secure press fit of components within the bore. A ball lens is press fit within the bore. The connector further includes a longitudinally-extending single-piece fiber stub with stepped outside diameters defining a press-fit end and a secondary connection end of lesser diameter the same as the ferrule diameter. A section of optical fiber is coaxially centered within and supported by the fiber stub. The press-fit end is press fit within the bore so that one end of the section of optical fiber is either in contact with or immediately adjacent the ball lens. There is a butt joint between the other end of the section of optical fiber and the end of the optical fiber being connected, the secondary connection end of the fiber stub contacting the ferrule. An alignment sleeve is provided around the secondary connection end of the fiber stub and the ferrule.

In another aspect, an expanded beam fiber optic connector for establishing an aligned connection of an end of an optical fiber with a ball lens is provided. The connector includes a ferrule at the end of the optical fiber supporting the optical fiber, the optical fiber being coaxially centered within the ferrule. The ferrule has a ferrule outside diameter. The connector also includes a housing including a bore having a bore inside diameter larger than the ferrule outside diameter. The housing is made of a compressible material for secure press fit of components within the bore. A ball lens is press fit within the bore. The connector further includes a longitudinally-extending sleeve having an outside diameter sized for being press-fit within the bore and an inside diameter sized for receiving the ferrule, the sleeve being press-fit within the bore adjacent the ball lens. The ferrule is inserted within the sleeve so that the end of the optical fiber is either in contact with or immediately adjacent the ball lens.

DETAILED DESCRIPTION

Figure 1:
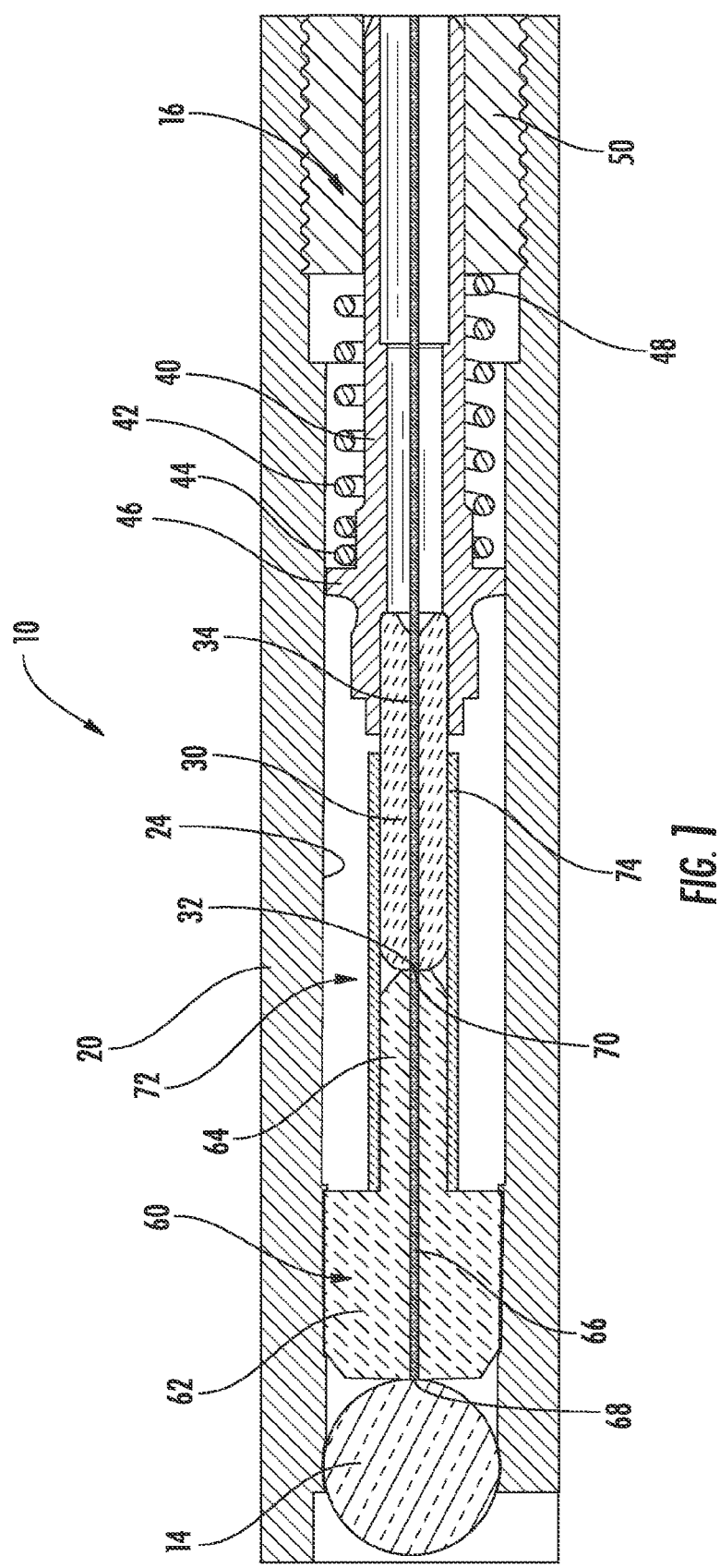
FIG. 1 is a cross sectional view of a first embodiment of the invention, including a fiber optic housing utilizing a ball lens transmitting an optical signal between the ball lens and a fiber secured to a one piece fiber stub.
Figure 2:
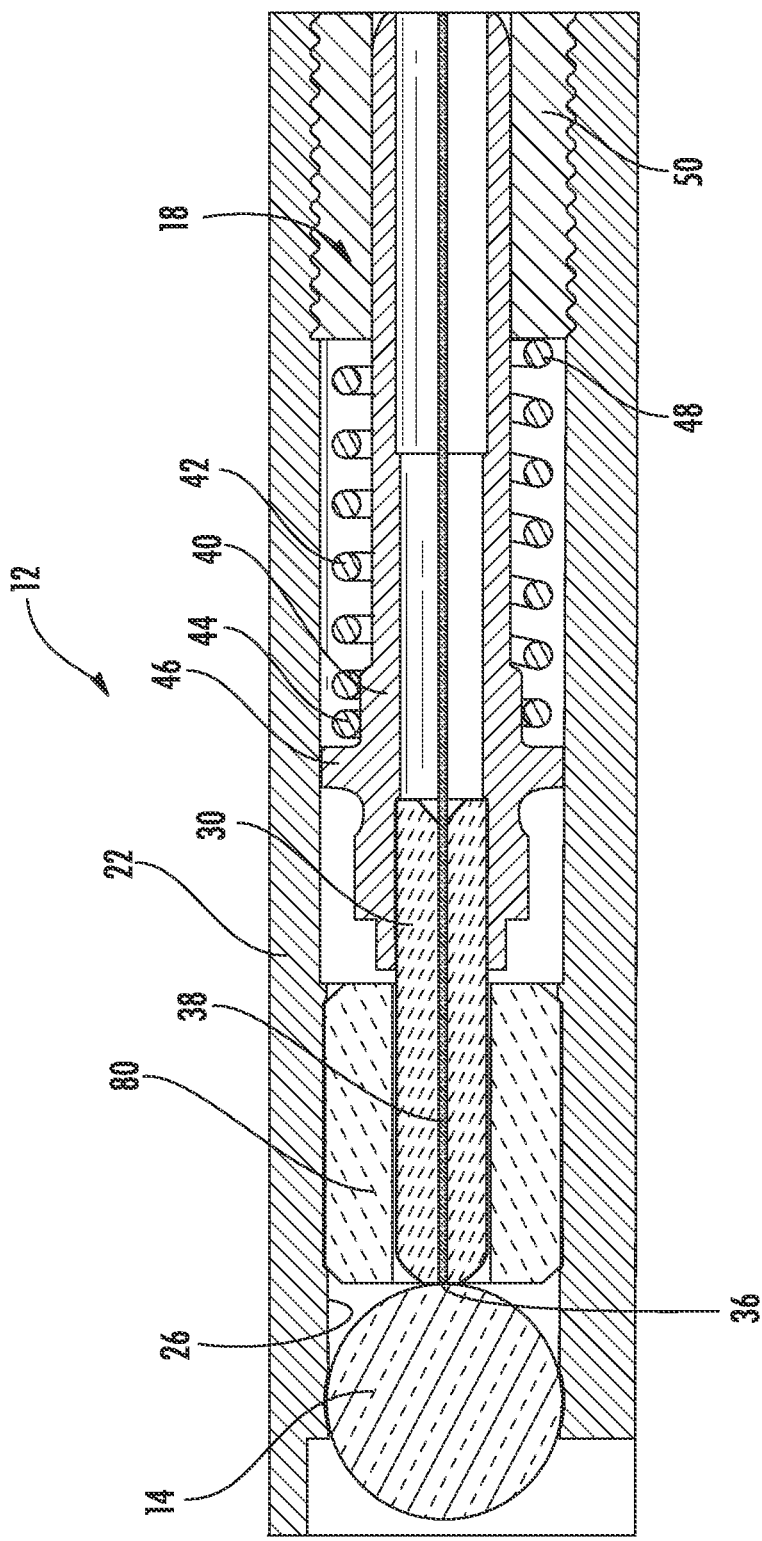
FIG. 2 is a cross sectional view of a second embodiment of the invention, including a fiber optic housing utilizing a ball lens transmitting an optical signal between the ball lens and a fiber secured within a one piece sleeve surrounding a floating ferrule.

FIGS. 1 and 2 are cross sectional views of respective fiber optic assemblies 10 (FIG. 1) and 12 (FIG. 2) for directing optical signals between a ball lens 14 and an optical fiber circuit 16 (FIG. 1) or an optical fiber circuit 18 (FIG. 2). Each of the fiber optic assemblies 10 and 12 generally represents a fiber optic connector 10 or 12, and is one-half of an expanded beam fiber optic connector. The optical fiber circuits 16 and 18 are each representative of either a transmitting optical fiber or a receiving optical fiber.

The fiber optic assemblies 10 and 12 include respective housings 20 and 22 having respective bores 24 and 26. The housings 20 and 22 are designed to ensure that, once the physical parameters of the equipment have been engineered, the light transmission between components is reliable. Each of the housings 20 and 22 is formed of a metal or alloy that is sufficiently compressible to achieve a secure press fit or interference fit with components within the bore 24 or 26, as described in detail hereinbelow. In the embodiments disclosed herein, the press-fit components, again as described in detail hereinbelow, are made of ceramic materials. Although the terminology "press fit" is employed herein, the terminology "interference fit" may as well be employed, and the two are intended to mean the same thing with reference to the subject disclosure. Press fitting eliminates additional mechanical structures, such as rings or fittings, to hold the components, and also avoids specialized adhesives. By way of example and not limitation, the housings 20 and 22 may be made of stainless steel.

The optical fiber circuits 16 and 18 are essentially identical. Each includes a ceramic ferrule 30 at an end 32 of an optical fiber 34 (FIG. 1) or an end 36 of an optical fiber 38 (FIG. 2) supporting the optical fiber 34 or 38. Thus, the optical fiber 34 is part of the FIG. 1 optical fiber circuit 16, and the optical fiber 38 is part of the FIG. 2 optical fiber circuit 18.

The optical fiber 34 or 38 is coaxially centered within the ferrule 30. The ferrule 30 has a ferrule outside diameter which, in the illustrated embodiments, is 1.25 mm.

The bores 24 and 26 within the housings 20 and 22 each have a bore inside diameter larger than the ferrule outside diameter. In the illustrated embodiments, the bore inside diameters are essentially 3 mm.

In addition to the ferrules 30, the optical fiber circuits 16 and 18 include a stainless steel termini body 40 partially surrounding one end of the ferrule 30, as well as a compression spring 42 having an end 44 which bears against a flange 46 on the termini body 40 to urge the ferrule 30 to the left in the orientation of FIGS. 1 and 2. The other end 48 of the spring 42 bears against a screwed-in annular flange 50.

The ball lens is press fit within the bore 24 (FIG. 1) or bore 26 (FIG. 2). Thus, the diameter of the ball lens 14 is also essentially 3 mm. However, to facilitate a press fit, either the inside diameters of the bores 24 and 26 are slightly less than 3 mm, or the outside diameter of the ball lens is slightly more than 3 mm.

With particular reference to the cross sectional view of FIG. 1, the fiber optic assembly 10 embodying the invention as a first particular embodiment utilizes a longitudinally-extending single piece ceramic fiber stub 60. The fiber stub 60 has stepped outside diameters defining a press-fit end 62 and a secondary connection end 64 of a lesser diameter, which lesser diameter is the same as the ferrule 30 diameter. Coaxially centered within and supported by the fiber stub 60 is a pre-fabricated section 66 of optical fiber having a lens-interfacing end 68 and a secondary connection end 70. The section 66 of optical fiber is glued inside the fiber stub 60, and polished on both ends 68 and 70. In the illustrated embodiment, the diameter of the press fit end 62 is 3 mm, and the diameter of the secondary connection end 64 is 1.25 mm. However, again, to facilitate a press fit, either the inside diameter of the bore 24 is slightly less than 3 mm, or the outside diameter of the press fit end 62 of the fiber stub 60 is slightly greater than 3 mm.

The press-fit end 62 of the ceramic fiber stub 60 is press fit within the bore 24 so that the lens-interfacing end 68 end of the section 66 of optical fiber is either in contact with or immediately adjacent the ball lens 14. The fiber stub 62 accordingly stays in place with no other adhesives, nor mechanical fasteners or fittings.

The FIG. 1 embodiment includes a secondary optical connection 72, in the form of a butt joint between the secondary connection end 70 of the section 66 of optical fiber and the end 32 of the optical fiber 34 being connected. The secondary connection end 64 of the fiber stub 60 contacts the ferrule 30.

To ensure that the secondary optical connection 72 is secure and in alignment, there is an alignment sleeve 74 around the secondary connection end 64 of the fiber stub 50 and the ferrule 30. The alignment sleeve 74 takes the form of a split sleeve 74, having a longitudinal split or gap of approximately 1 mm, and made of zirconium dioxide, also known as zirconia.

With particular reference to the cross sectional view of FIG. 2, the fiber optic assembly 12 embodying the invention as a second particular embodiment provides enhanced security of engineered components in an optical circuit. Instead of the FIG. 1 prefabricated fiber optic stub 60 and the secondary optical connection 72, the fiber optic assembly 12 of FIG. 2 has the press-fit ball lens 14 in optical communication with the end 36 of the optical fiber 38 being connected, representing the optical fiber circuit 18. Thus, in the FIG. 2 fiber optic assembly 12, the end 36 of the optical fiber 38 representing the optical fiber circuit is either in contact with or immediately adjacent the ball lens 14.

A longitudinally extending ceramic sleeve 80 has an outside diameter sized for being press fit within the bore 26 and an inside diameter sized for receiving the ferrule 30. In the illustrated embodiment, the outside diameter of the sleeve 80 is 3 mm. However, again, to facilitate a press fit, either the inside diameter of the bore 26 is slightly less than 3 mm, or the outside diameter of the sleeve is slightly more than 3 mm. The sleeve 80 is press fit within the bore 26 adjacent the ball lens 14.

In the illustrated embodiment, the inside diameter of the sleeve 80 is essentially 1.25 mm to match the 1.25 mm outside diameter of the ferrule 30. However, to provide a floating fit so that the ferrule 30 can be removed by hand, either the inside diameter of the sleeve 80 is slightly greater than 1.25 mm, or the outside diameter of the ferrule is slightly less than 1.25 mm.

The ferrule 30 is inserted within the sleeve 80 so that the end 36 of the optical fiber 38 is either in contact with or immediately adjacent the ball lens 14. Again, the ferrule 30 is in a floating, non-permanent engagement with the sleeve 80, and is manually removable from the sleeve 80 for maintenance purposes.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. An expanded beam fiber optic connector for establishing an aligned connection of an end of an optical fiber with a ball lens, said connector comprising:
    a ferrule at the end of the optical fiber supporting the optical fiber, the optical fiber being coaxially centered within said ferrule, and said ferrule having a ferrule outside diameter;
    a housing including a bore having a bore inside diameter larger than the ferrule outside diameter, said housing being made of a compressible material for secure press fit of components within said bore;
    a ball lens press fit within said bore;
    a longitudinally-extending single-piece fiber stub with stepped outside diameters defining a press-fit end and a secondary connection end of lesser diameter the same as the ferrule diameter, a section of optical fiber being coaxially centered within and supported by said fiber stub, and said press-fit end press fit within said bore so that one end of said section of optical fiber is either in contact with or immediately adjacent said ball lens;
    a butt joint between the other end of said section of optical fiber and the end of the optical fiber being connected, said secondary connection end of said fiber stub contacting said ferrule; and
    an alignment sleeve around said secondary connection end of said fiber stub and a first portion of said ferrule, wherein a second portion of said ferrule is not surrounded by said alignment sleeve.

2. The expanded beam fiber optic connector of claim 1, wherein said housing comprises stainless steel.

3. The expanded beam fiber optic connector of claim 1, wherein said ferrule comprises a ceramic material.

4. The expanded beam fiber optic connector of claim 1, wherein said single-piece fiber stub comprises a ceramic material.

5. The expanded beam fiber optic connector of claim 1, wherein said alignment sleeve is a split sleeve.

6. An expanded beam fiber optic connector for establishing an aligned connection of an end of an optical fiber with a ball lens, said connector comprising:

a ferrule at the end of the optical fiber supporting the optical fiber, the optical fiber being coaxially centered within said ferrule, and said ferrule having a ferrule outside diameter;

a housing including a bore having a bore inside diameter larger than the ferrule outside diameter, said housing being made of a compressible material for secure press fit of components within said bore;

a ball lens press fit within said bore;

a longitudinally-extending sleeve having an outside diameter sized for being press-fit within said bore and an inside diameter sized for receiving said ferrule, said sleeve being press-fit within said bore adjacent said ball lens;

a longitudinally-extending single-piece fiber stub with stepped outside diameters defining a press-fit end and a secondary connection end of lesser diameter the same as the ferrule diameter, a section of optical fiber being coaxially centered within and supported by said fiber stub, and said alignment sleeve surrounding said secondary connection end of said fiber stub; and said ferrule being inserted within said sleeve so that the end of the optical fiber is either in contact with or immediately adjacent said ball lens, and wherein said ferrule is in a floating, non-permanent engagement with said sleeve.

7. The expanded beam fiber optic connector of claim 6, wherein said housing comprises stainless steel.

8. The expanded beam fiber optic connector of claim 6, wherein said ferrule comprises a ceramic material.

\* \* \* \* \*